(12) United States Patent
Ishiyama

(10) Patent No.: US 9,152,861 B2
(45) Date of Patent: Oct. 6, 2015

(54) INDIVIDUAL PRODUCT IDENTIFICATION SYSTEM, INDIVIDUAL PRODUCT IDENTIFICATION METHOD, AND DEVICE AND PROGRAM USED BY SAME

(75) Inventor: Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 212 days.

(21) Appl. No.: 14/002,942

(22) PCT Filed: Mar. 2, 2012

(86) PCT No.: PCT/JP2012/055443
§ 371 (c)(1),
(2), (4) Date: Sep. 3, 2013

(87) PCT Pub. No.: WO2012/121167
PCT Pub. Date: Sep. 13, 2012

(65) Prior Publication Data
US 2013/0336542 A1 Dec. 19, 2013

(30) Foreign Application Priority Data
Mar. 4, 2011 (JP) .................. 2011-047241

(51) Int. Cl.
*G06K 9/00* (2006.01)
*G06Q 10/08* (2012.01)
*G06Q 50/02* (2012.01)
*G06Q 50/28* (2012.01)

(52) U.S. Cl.
CPC .............. *G06K 9/00536* (2013.01); *G06K 9/00* (2013.01); *G06Q 10/087* (2013.01); *G06Q 50/02* (2013.01); *G06Q 50/28* (2013.01); *G06K 2209/17* (2013.01)

(58) Field of Classification Search
USPC ................................................ 382/181–231
See application file for complete search history.

(56) References Cited

U.S. PATENT DOCUMENTS 4,817,183 A * 3/1989 Sparrow ........................ 382/125
5,659,624 A * 8/1997 Fazzari et al. ................ 382/110
(Continued)

FOREIGN PATENT DOCUMENTS

JP 3355366 B2 12/2002
JP 2006-146570 A 6/2006

OTHER PUBLICATIONS

Communication dated Jul. 24, 2014 issued by the European Patent Office in counterpart European application No. 12754400.5.
(Continued)

*Primary Examiner* — Alex Liew
(74) *Attorney, Agent, or Firm* — Sughrue Mion, PLLC

(57) ABSTRACT

The present invention is an individual product identification method, comprising: previously storing epidermal pattern images in a predetermined scope with a predetermined location of a registered product taken as a reference; imaging the epidermal pattern in the predetermined scope with the predetermined location of the product, being a target of individual product identification, taken as a reference; correcting the imaged epidermal pattern image of the product, being a target of individual product identification to an image for collation with the registered product with the predetermined location of the product taken as a reference: and collating an image characteristic of the epidermal pattern image of the registered product with the image characteristic of the corrected epidermal pattern image, and identifying whether the product, being a target of individual product identification, is one of the registered products.

18 Claims, 8 Drawing Sheets

AREA WITHIN CIRCUMFERENCE WITH OPERCULUM AT CENTER

(56) References Cited

U.S. PATENT DOCUMENTS

| | | | |
|---|---|---|---|
| 5,959,541 A * | 9/1999 | DiMaria et al. | 340/5.52 |
| 5,995,014 A * | 11/1999 | DiMaria | 340/5.52 |
| 6,219,438 B1 * | 4/2001 | Giordano et al. | 382/110 |
| 6,236,741 B1 * | 5/2001 | Kovacs-Vajna | 382/125 |
| 6,416,959 B1 * | 7/2002 | Giuliano et al. | 435/7.2 |
| 6,463,426 B1 * | 10/2002 | Lipson et al. | 1/1 |
| 7,722,867 B2 * | 5/2010 | Umana et al. | 424/130.1 |
| 7,933,435 B2 * | 4/2011 | Hunter et al. | 382/128 |
| 2004/0200892 A1 | 10/2004 | Curkendall et al. | |
| 2004/0231009 A1 * | 11/2004 | Zoghbi et al. | 800/9 |
| 2004/0264762 A1 * | 12/2004 | Mas et al. | 382/154 |
| 2004/0264763 A1 * | 12/2004 | Mas et al. | 382/154 |
| 2005/0136549 A1 * | 6/2005 | Gholap et al. | 436/501 |
| 2006/0188140 A1 * | 8/2006 | Gholap et al. | 382/133 |
| 2007/0127781 A1 * | 6/2007 | Stewart | 382/110 |
| 2008/0140234 A1 * | 6/2008 | Shafter | 700/91 |
| 2008/0144880 A1 * | 6/2008 | DeLuca | 382/100 |
| 2008/0253648 A1 * | 10/2008 | Mulder et al. | 382/165 |
| 2009/0116724 A1 * | 5/2009 | Yamashita et al. | 382/133 |
| 2009/0242631 A1 | 10/2009 | Wishnatzki et al. | |
| 2010/0136549 A1 * | 6/2010 | Christiansen et al. | 435/6 |
| 2010/0290692 A1 * | 11/2010 | Macaulay et al. | 382/133 |
| 2010/0317002 A1 * | 12/2010 | Daniely et al. | 435/6 |
| 2012/0087547 A1 * | 4/2012 | He et al. | 382/110 |
| 2013/0051637 A1 * | 2/2013 | Kulcke et al. | 382/124 |
| 2014/0270457 A1 * | 9/2014 | Bhargava | 382/133 |

OTHER PUBLICATIONS

Yoshihiro Inagaki, "Gazo o Riyo shita Nosanbutsu no Sancho Shomei System", CASIO Disclosure Journal, Oct. 16, 2003, vol. 195.

Hitoshi Niigaki, " Recognition of 3D Objects with Similar Shapes using Multi-View Images ", IPSJ SIG Notes, Mar. 10, 2008, pp. 151-156, vol. 2008, No. 27.

International Search Report of PCT/JP2012/055443 dated Jun. 5, 2012.

Written Opinion of PCT/JP2012/055443 dated Jun. 5, 2012.

* cited by examiner

AREA WITHIN PREDETERMINED CIRCUMFERENCE INCLUDING OPERCULUM AND PLANT STEM

INDIVIDUAL PRODUCT IDENTIFICATION SYSTEM, INDIVIDUAL PRODUCT IDENTIFICATION METHOD, AND DEVICE AND PROGRAM USED BY SAME

CROSS REFERENCE TO RELATED APPLICATIONS

This is a National Stage of International Application No. PCT/JP2012/055443 filed Mar. 2, 2012, claiming priority based on Japanese Patent Application No. 2011-047241 filed Mar. 4, 2011, the contents of all of which are incorporated herein by reference in their entirety.

TECHNICAL FIELD

The present invention relates to an individual product identification system, an individual product identification method, and a device and a program used by the same.

BACKGROUND ART

In recent years, consciousness of pickiness etc. about safety and production districts of agricultural, forest and fishery products, and the like has been increased in customers and retailers. However, with regard to the production districts, the producers and the wholesalers that ship the agricultural, forest and fishery products to be put on shops of the retailers, the customers and retailers have no means of knowing them.

Namely, in the conventional distribution system of the agricultural, forest and fishery product, many intermediate customers (multiple wholesales etc.) stand between the producers and the customers. Due to the fact that many intermediate customers stand between the producers and the customers in such a manner, when the agricultural, forest and fishery product is delivered to the customers, it is difficult that individual product information (the production district, a producer name, a variety, a cultivation method, a harvest day, quality information, and the like of the above agricultural, forest and fishery product) of the above agricultural, forest and fishery product is precisely conveyed.

Thereupon, the individual product information acquisition system of agricultural products that enables the customer etc. to easily know individual product information of the agricultural products has been proposed (for example, Patent literature 1).

In the technology of the Patent literature 1, affixing an ID number, being an identifier, to the agricultural product such as a melon allows persons (for example, customers) other than persons involved in producing these melons (producing farmers or agricultural cooperatives) to freely acquire individual product information related to the above melon based on the above-mentioned ID number. For this, a label (seal or sticker) having the ID number described therein is affixed to the agricultural product.

Further, the technology of the Patent literature 1 causes a computer system installed in a separately-installed neutral engine (for example, a database agency) to store the individual product information related to the agriculture product together with the above-mentioned ID number, and structures a database. The producer transmits the above-mentioned ID number to this computer system, and together with it, transmits the production district, the producer name, the variety, the cultivation method, the harvest day and the quality information (a sugar content etc.) each of which is the individual product information of the above agriculture product.

At least one computer is installed in the shop of the retailer and the home of the customer, and together with it, the computer is connected to the above-mentioned computer system via a general public circuit in a manner of free communication. And the shop of the retailer and the customer transmit the ID number described in the label affixed to the agriculture product to the computer system, thereby making it possible to acquire the individual product information related to the agriculture product to be specified by the above ID number.

CITATION LIST

Patent Literature

PTL 1: Japanese Patent No. 3355366

SUMMARY OF INVENTION

Technical Problem

However, with the case of the method of identifying an individual product by affixing the label (seal or sticker) to the agricultural, forest and fishery product as is the case with the Patent literature 1, or by a packing material etc., when the label (hereinafter, what is referred to as the label includes not only the label but also the packing material) is intentionally peeled off from the agricultural, forest and fishery products, or the label is duplicated/imitated and affixed to other similar agricultural, forest and fishery products, camouflage of the shipping source of the agricultural, forest and fishery products and the like cannot be prevented because of no method that make it possible to identify the individual product of the agricultural, forest and fishery product.

Further, it is also thinkable to burry an IC tag or something like it into the agricultural, forest and fishery product instead of the appendix like the label; however, a commodity value declines due to damaging to the agricultural, forest and fishery product and the like. Further, there is a problem that employing the IC tag leads to a high cost as an entirety of the system.

Thereupon, the present invention has been accomplished in consideration of the above-mentioned problems, and an object of the present invention is to provide an individual product identification system an individual product identification method that make it possible to identify the individual product of the agricultural, forest and fishery product without necessitating a special device such as the IC tag, and a device and a program used by them.

Solution to Problem

The present invention is an individual product identification system of an agricultural, forest and fishery product, comprising: a storing means in which epidermal pattern images in a predetermined scope with a predetermined location of the registered agricultural, forest and fishery product taken as a reference are stored; an imaging means that images the epidermal pattern in the predetermined scope with the predetermined location of the agricultural, forest and fishery product, being a target of individual product identification, taken as a reference; an image correcting means that corrects the epidermal pattern image of the agricultural, forest and fishery product, being a target of individual product identification, imaged by said imaging means to an image for collation with said registered agricultural, forest and fishery product with said predetermined location of the agricultural, forest and fishery product taken as a reference; and an individual product identifying means that collates an image characteristic of the epidermal pattern image of said registered agricultural, forest and fishery product with the image characteristic of said corrected epidermal pattern image, and identifies whether said agricultural, forest and fishery product, being a target of individual product identification, is one of the registered agricultural, forest and fishery products.

The present invention is an individual product identification server of an agricultural, forest and fishery product for identifying whether the agricultural, forest and fishery product, being a target of individual product identification, is one of registered agricultural, forest and fishery products of which an epidermal pattern with a predetermine location taken a reference has been registered, comprising: an image correcting means that corrects a received image of the epidermal pattern of the agricultural, forest and fishery product, being a target of individual product identification, to an image for collation with said registered agricultural, forest and fishery product with said predetermined location of the agricultural, forest and fishery product taken as a reference; and an individual product identifying means that collates an image characteristic of the epidermal pattern image of said registered agricultural, forest and fishery product with the image characteristic of said corrected epidermal pattern image, and identifies whether said agricultural, forest and fishery product, being a target of individual product identification, is one of the registered agricultural, forest and fishery products.

The present invention is an image registration device for, into an individual product identification server of an agricultural, forest and fishery product for identifying whether the agricultural, forest and fishery product, being a target of individual product identification, is one of registered agricultural, forest and fishery products of which an epidermal pattern with a predetermine location taken a reference has been registered, registering an image of the epidermal pattern of said registered agricultural, forest and fishery product, comprising: an imaging means that images the epidermal pattern in a predetermined scope with the predetermined location of the registered agricultural, forest and fishery product taken as a reference; an image correcting means that corrects the epidermal pattern image of the agricultural, forest and fishery product imaged by said imaging means to an image for collation with the predetermined location of said registered agricultural, forest and fishery product taken as a reference; and a registering means that registers said corrected image for collation into the individual product identification server.

The present invention is an individual product identification terminal device for identifying whether an agricultural, forest and fishery product, being a target of individual product identification, is one of registered agricultural, forest and fishery products, comprising: a storing means in which epidermal pattern images in a predetermined scope with a predetermined location of the registered agricultural, forest and fishery product taken as a reference are stored; an imaging means that images the epidermal pattern in a predetermined scope with the predetermined location of the agricultural, forest and fishery product, being a target of individual product identification, taken as a reference; an image correcting means that corrects the epidermal pattern image of the agricultural, forest and fishery product, being a target of individual product identification, imaged by said imaging means, to an image for collation with said registered agricultural, forest and fishery product with said predetermined location of the agricultural, forest and fishery product taken as a reference: an individual product identifying means that collates an image characteristic of the epidermal pattern image of said registered agricultural, forest and fishery product with the image characteristic of said corrected epidermal pattern image, and identifies whether said agricultural, forest and fishery product, being a target of individual product identification, is one of the registered agricultural, forest and fishery products; and a displaying means that displays said identification result.

The present invention is an individual product identification method, comprising: previously storing epidermal pattern images in a predetermined scope with a predetermined location of a registered agricultural, forest and fishery product taken as a reference; imaging the epidermal pattern in the predetermined scope with the predetermined location of the agricultural, forest and fishery product, being a target of individual product identification, taken as a reference; correcting said imaged epidermal pattern image of the agricultural, forest and fishery product, being a target of individual product identification to an image for collation with said registered agricultural, forest and fishery product with said predetermined location of the agricultural, forest and fishery product taken as a reference: and collating an image characteristic of the epidermal pattern image of said registered agricultural, forest and fishery product with the image characteristic of said corrected epidermal pattern image, and identifying whether said agricultural, forest and fishery product, being a target of individual product identification, is one of the registered agricultural, forest and fishery products.

The present invention is an individual product identification program of an agricultural, forest and fishery product for identifying whether the agricultural, forest and fishery product, being a target of individual product identification, is one of registered agricultural, forest and fishery products of which an epidermal pattern with a predetermine location taken a reference has been registered, said program causing an information processing device to execute comprising: an image correction process of correcting a received image of the epidermal pattern of the agricultural, forest and fishery product, being a target of individual product identification, to an image for collation with said registered agricultural, forest and fishery product with said predetermined location of the agricultural, forest and fishery product taken as a reference; and an individual product identification process of collating an image characteristic of the epidermal pattern image of said registered agricultural, forest and fishery product with the image characteristic of said corrected epidermal pattern image, and identifying whether said agricultural, forest and fishery product, being a target of individual product identification, is one of the registered agricultural, forest and fishery products.

Advantageous Effect of Invention

The present invention can identify the individual product of the agricultural, forest and fishery product without necessitating a special device such as the IC tag.

DESCRIPTION OF EMBODIMENTS

The exemplary embodiment of the present invention will be explained.

Figure 1:
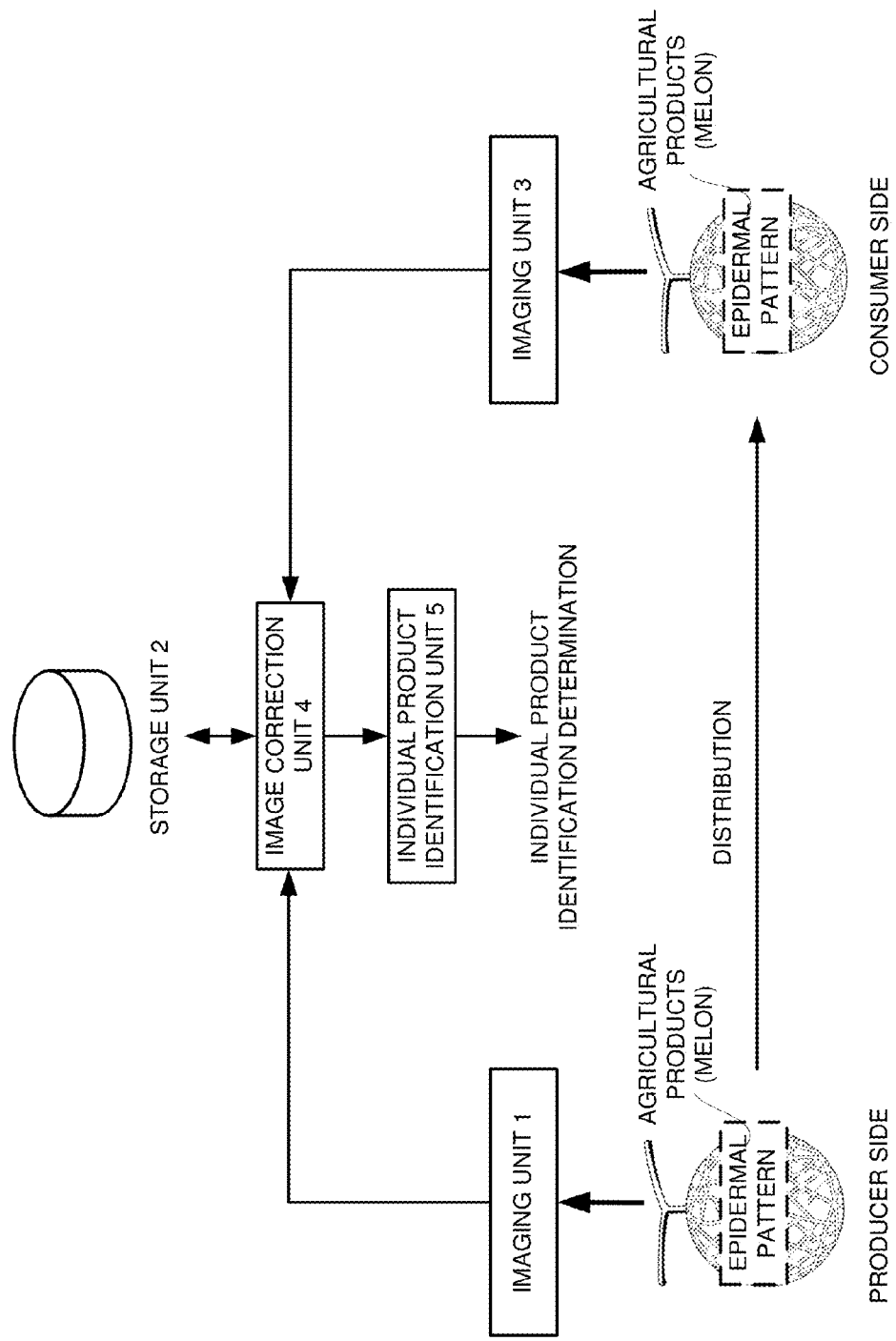
FIG. 1 is a block diagram illustrating an exemplary embodiment of the present invention.

FIG. 1 is a block diagram illustrating the exemplary embodiment of the present invention.

The exemplary embodiment of the present invention is an individual product identification system of an agricultural, forest and fishery product including an imaging unit 1 that images an image of an epidermal pattern with a predetermined location of a registered agricultural, forest and fishery product taken as a reference, a storage unit 2 in which the imaged epidermal pattern images of the registered agricultural, forest and fishery product are stored, an imaging unit 3 that images the epidermal pattern in a predetermined scope with a predetermined location of the agricultural, forest and fishery product, being a target of individual product identification, taken as a reference, an image correction unit 4 that corrects the epidermal pattern image of the agricultural, forest and fishery product, being a target of individual product identification, imaged by the imaging unit 1 or the imaging unit 3 to an image for collation with the aforementioned predetermined location of the agricultural, forest and fishery product taken as a reference, and an individual product identification unit 5 that collates the image characteristic of the epidermal pattern image of the registered agricultural, forest and fishery product with the image characteristic of the epidermal pattern image of the agricultural, forest and fishery product, being a target of individual product identification, and identifies whether the agricultural, forest and fishery product, being a target of individual product identification, is one of the registered agricultural, forest and fishery products.

The present invention utilizes the fact that the epidermal pattern of the agricultural, forest and fishery product differs for each individual product, and performs the individual product identification with the above epidermal pattern. Thus, the agricultural, forest and fishery product for which the present invention is applied is not particularly limited so far as the epidermal pattern of the agricultural, forest and fishery product is distinctive, and as the agricultural, forest and fishery product of which the epidermal pattern is distinctive, there exist, for example, a melon, a strawberry, an apple, a lemon, a pear, a mandarin, fishery products, wood, and the like. Further, as the epidermal pattern of the agricultural, forest and fishery product, for example, a surface pattern of the melon, a grain of a seed of the surface of the strawberry, a leaf vein of the fresh flower, a scale of the fish, a grain and annual ring of the wood, and the like. Additionally, in the following, the melon is exemplified as the agricultural, forest and fishery product for explanation.

Additionally, in the following, the agricultural, forest and fishery product to be registered in the storage unit 2 by a producer and the production manager is described as a registered agricultural, forest and fishery product.

The imaging unit 1 images the image of the epidermal pattern with a predetermined location of the registered agricultural, forest and fishery product taken as a reference. A special device for imaging the agricultural, forest and fishery product may be installed; however, a digital camera, a mobile telephone and the like provided with CCD, CMOS and the like may be used. This predetermined location is an area with a visual performance having the characteristic that does not depends on the individual product, whereby, for example, the location in the image can be automatically specified and the image of the epidermal pattern can be also automatically imaged with a predetermined location taken as a reference by employing the technology like the document (HOSOI Toshinori, SUZUKI Tetsuaki, and SATO Atsushi, Face detection based on Generalized Learning Vector Quantization (LVQ), The Institute of Electronics, Information and Communication Engineers, Technology Research Report, vol. 102, No. 651 (PRMU2002 201-210), pp. 47 to 52). Additionally, this technology is only one example, and the various publicly-known pattern detection technologies can utilized. In addition, any file format of the imaged image may be used, and JPEG and the like may be used. Additionally, the registered agricultural, forest and fishery product is photographed by persons who are engaged in the production (producing farmers or agricultural cooperatives), and persons who perform the quality management of the agricultural, forest and fishery product in the distribution stage; however, the photographers are not limited hereto.

Further, the image of the epidermal pattern of the agricultural, forest and fishery product that is imagined by the imaging unit 1 is photographed with a predetermined location of the agricultural, forest and fishery product taken as a reference. Herein, the so-called predetermined location of the agricultural, forest and fishery product is "operculum", "navel", "plant stem", "a label", "a scale, an eye, a gill, a fin of the fish and the like. These predetermined locations become a reference for correcting a position and a posture of a collation image at the moment of determining the individual product identification of the agricultural, forest and fishery product, which is later described.

Figure 2:
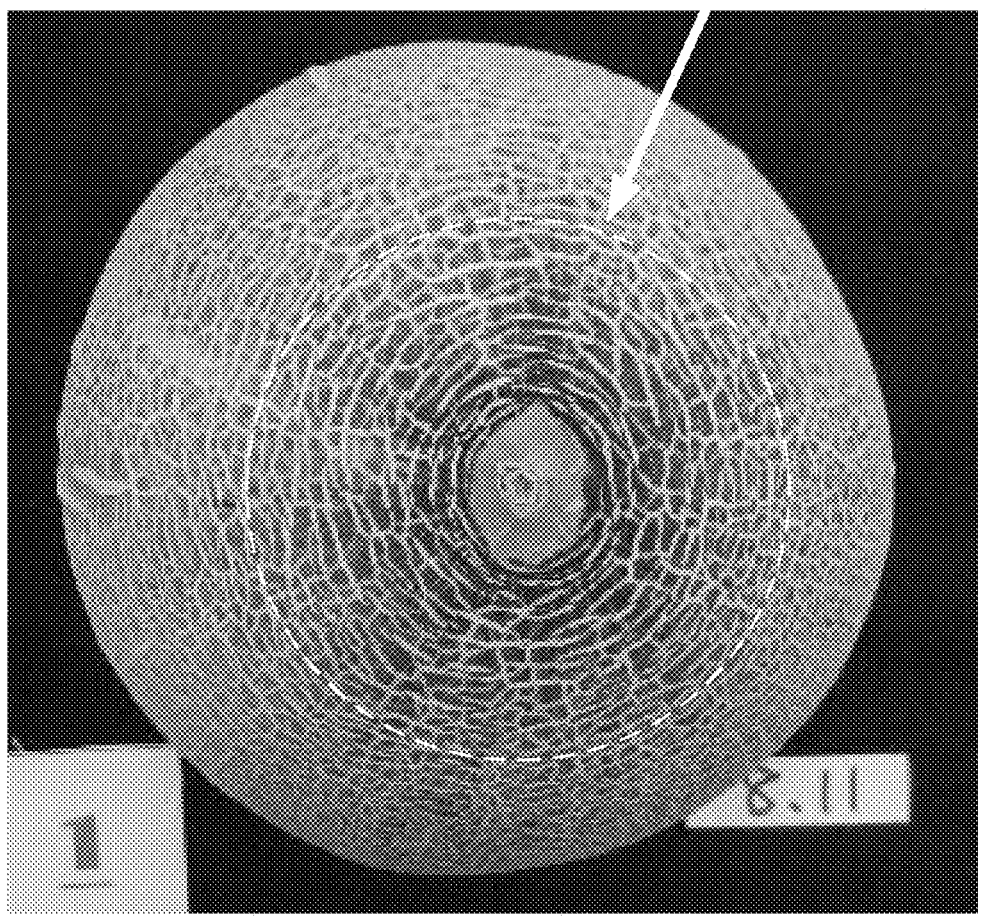
FIG. 2 is a view for explaining an epidermal pattern.
Figure 3:
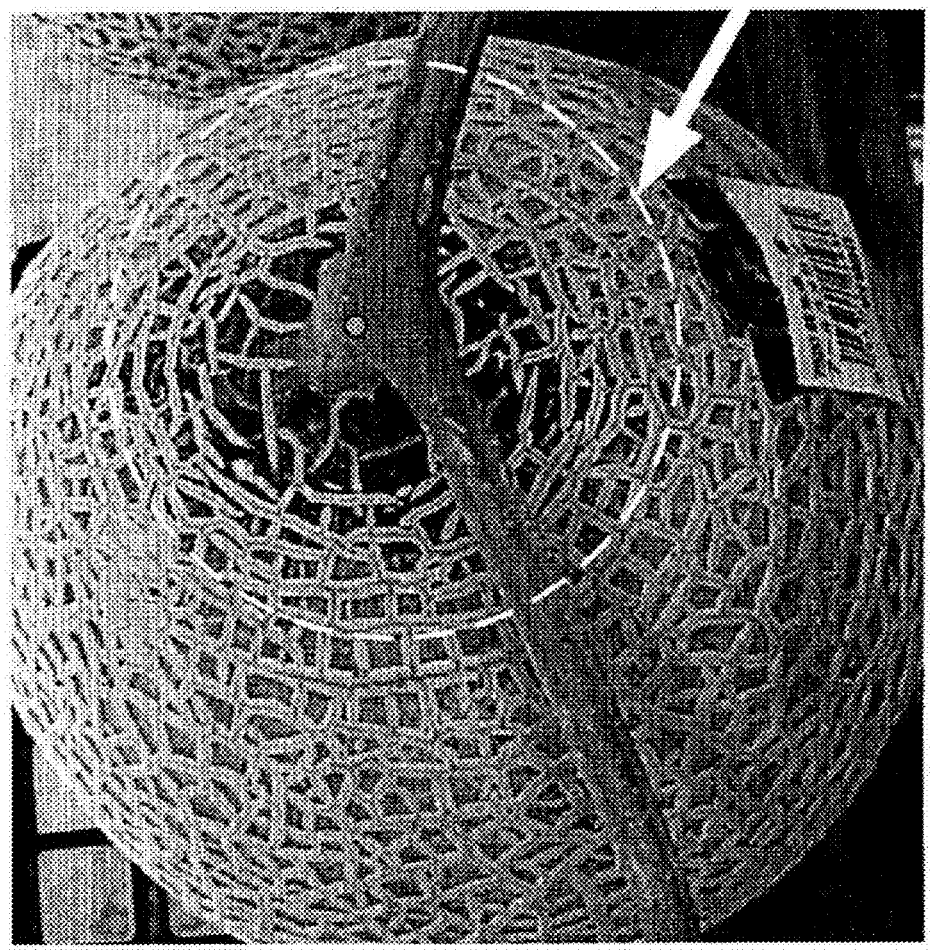
FIG. 3 is a view for explaining the epidermal pattern.

For example, with the case of taking the location of the operculum of the melon as a reference, the imaging unit 1 images the image including at least the epidermal pattern of the area within a predetermined circumference with the operculum at a center, as shown in FIG. 2. Further, as another example, as shown in FIG. 3, the imaging unit 1 may image the image including at least the epidermal pattern of the area within a predetermined circumference including the operculum and the plant stem of the melon.

The images of the epidermal patterns of the registered agricultural, forest and fishery product imagined by the imaging unit 1 are stored in the storage unit 2. Additionally, with the case in which the image of the epidermal pattern of the registered agricultural, forest and fishery product is not suitable for the collation, and with the case in which the collation process is performed at a high speed, the image correction unit 4 to be later described may correct the image of the epidermal pattern of the registered agricultural, forest and fishery product to cause the storage unit 2 to store the image subjected to the correction. Further, the storage unit 2 may store one image correspondingly to production information such as the production district, the producer name, the variety, the cultivation method, the harvest day, the quality information (the sugar content etc.) and readiness to eat of the above agricultural, forest and fishery product, distribution information such as the shipping location and the shipping date, and the like. Doing so makes it possible to acquire history information as well of the registered agricultural, forest and fishery product for which the collation has been performed.

The imaging unit 3, which exists in the side performing the individual product identification of the agricultural, forest and fishery product, for example, the consumer, has a configuration similar to that of the imaging unit 1. The consumer etc. demanding the individual product identification images the image of the epidermal pattern with the predetermined location of the agricultural, forest and fishery product, being a target of the individual product identification, taken as a reference. The imaged image is transmitted to the image correction unit 4.

The image correction unit 4 corrects the received image of the epidermal pattern with the predetermined location of the agricultural, forest and fishery product, being a target of the individual product identification, taken as a reference to an image for collation.

Figure 4:
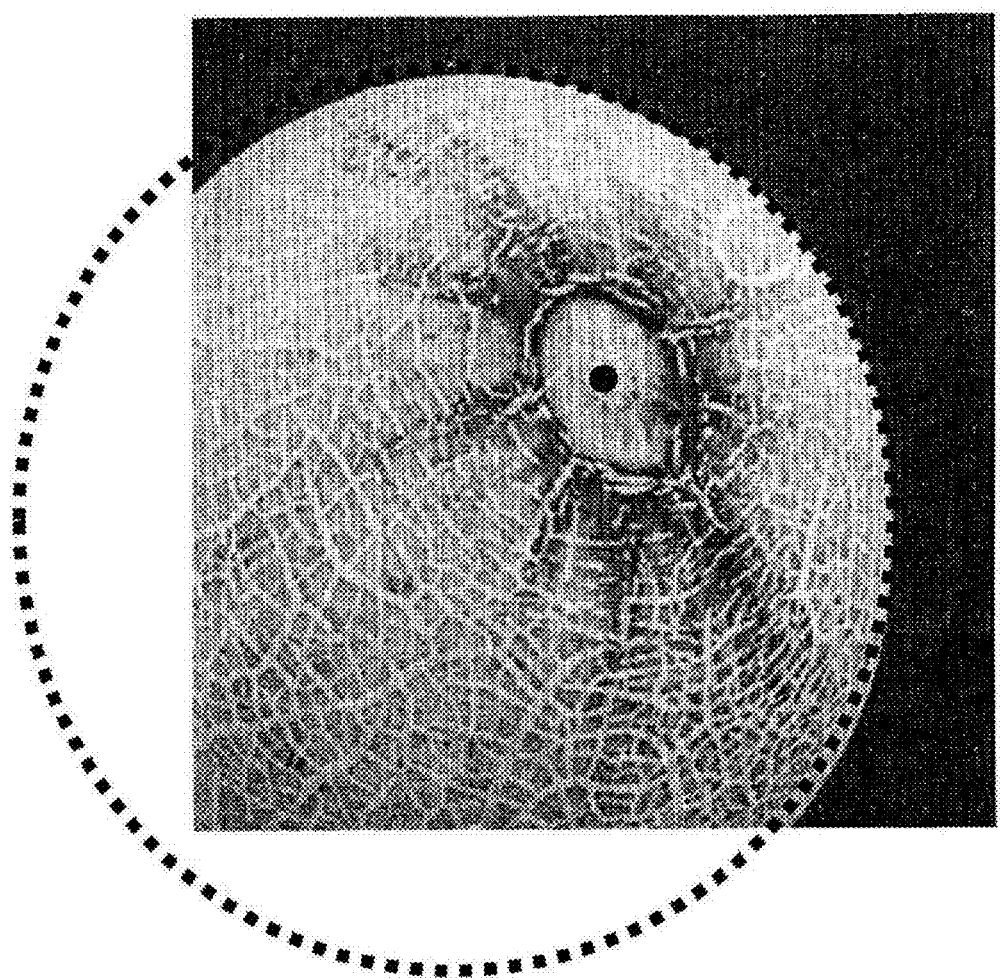
FIG. 4 is a view for explaining correction of the epidermal pattern image.
Figure 5:
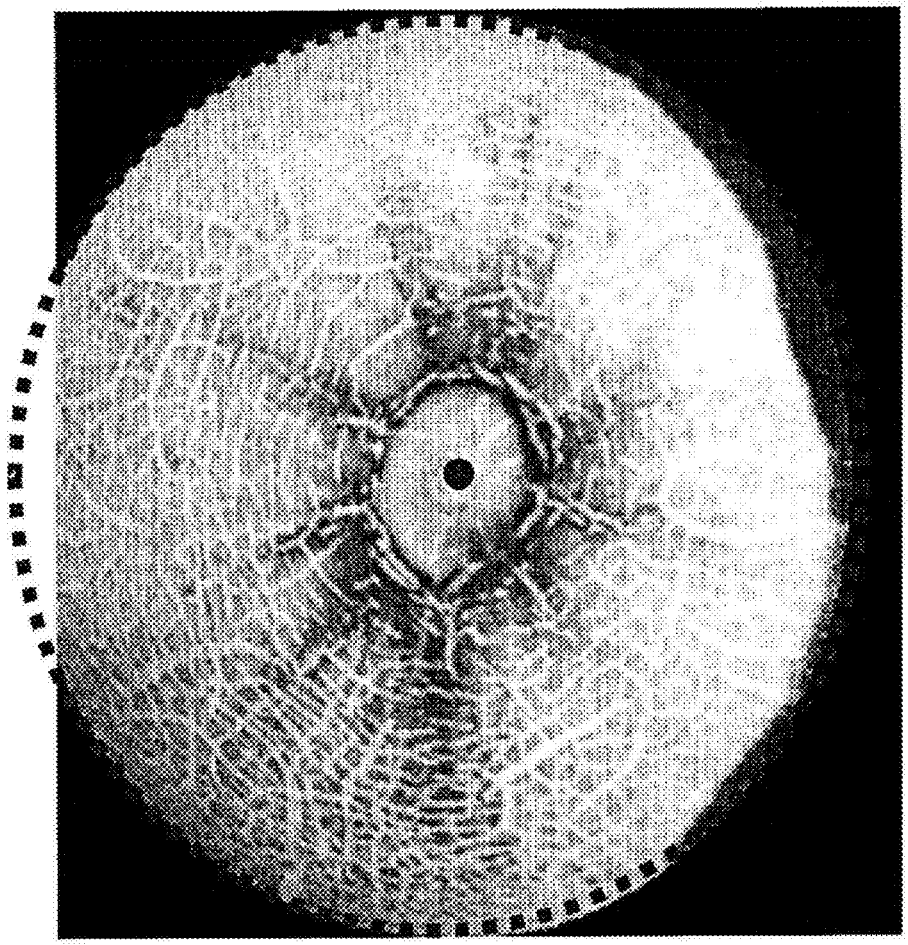
FIG. 5 is a view for explaining the correction of the epidermal pattern image.

With regard to the method of the image correction by the image correction unit 4, for example, when the image of the epidermal pattern of the registered agricultural, forest and fishery product stored in the storage unit 2, as shown in FIG. 2, is the image obtained by imaging the melon from the just top, and the image imaged by the imaging unit 3, as shown in FIG. 4, is the image obtained by diagonally imaging the melon, the image correction unit 4 corrects the image obtained by diagonally imaging the melon to the image obtained by imaging the melon from the just top so as to perform the collation with the image of the epidermal pattern of the registered agricultural, forest and fishery product by employing a reference point (a center of the operculum) and an average shape (sphere), as shown in FIG. 5.

Upon specifically explaining, as shown in an equation mentioned below, when a position of a reference on the image (the position of the operculum with a circle center at an origin point), a radius of a sphere, a position on the image subjected to the correction, and a position on the image no subjected to the correction are defined as (p, q), R, (x, y) and (x', y'), respectively, setting a luminance value of the image (x, y) subjected to the correction to a luminance value of the image (x', y') not subjected to the correction makes it possible to perform the correction.

[Numerical Equation 1]

$$x' = \frac{1}{\sqrt{p^2+q^2}}\left\{p\left(x\sqrt{1-\frac{p^2+q^2}{R^2}} + \sqrt{p^2+q^2}\sqrt{1-\frac{x^2+y^2}{R^2}}\right) - yq\right\}$$

$$y' = \frac{1}{\sqrt{p^2+q^2}}\left\{q\left(x\sqrt{1-\frac{p^2+q^2}{R^2}} + \sqrt{p^2+q^2}\sqrt{1-\frac{x^2+y^2}{R^2}}\right) + yp\right\}$$

Figure 6:
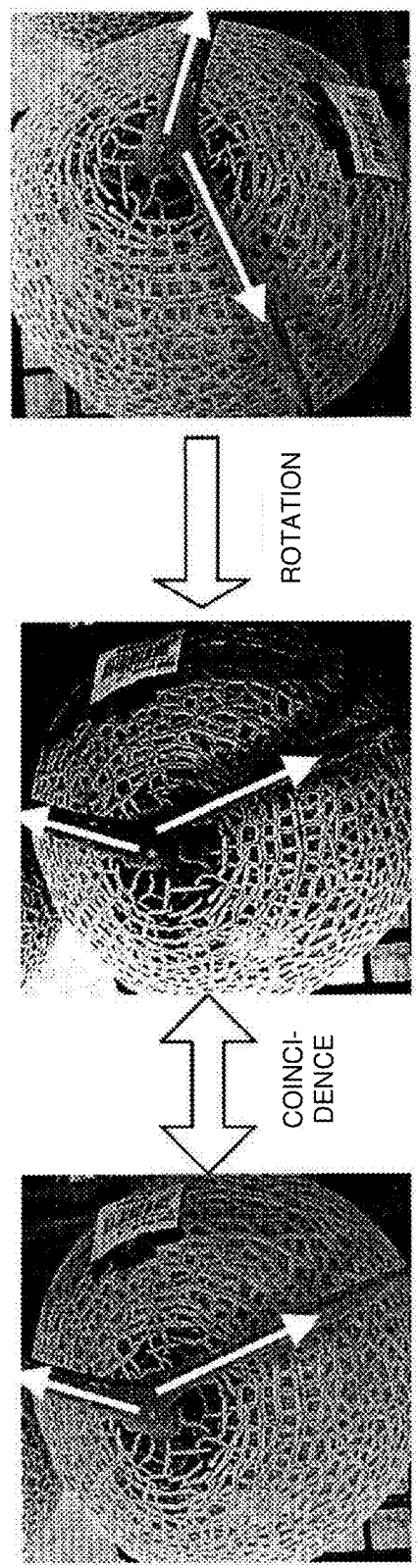
FIG. 6 is a view for explaining the correction of the epidermal pattern image.

(p, q): a position of the operculum with a circle center at an origin point
R: a radius of a sphere
(x, y): a pixel position in the image subjected to the conversion
(x' y'): a pixel position in the image not subjected to the conversion Further, when the image of the epidermal pattern of the registered agricultural, forest and fishery product stored in the storage unit 2, as shown in FIG. 3, includes the plant stem, and yet is the image obtained by imaging the melon from the just top, and the image of the melon, being a target of individual product identification, as shown in FIG. 6, has been imaged from the just top of the melon; however, differs in a position of the melon, the image correction unit 4 corrects the image by rotating the image of the melon, being a target of individual product identification, so that the plant stem direction of the melon of the registered agricultural, forest and fishery product and that of the melon, being a target of individual product identification, coincide with each other. Additionally, with the case of such a process, it is preferable to previously correct the image of the epidermal pattern of the registered agricultural, forest and fishery product by the image correction unit 4 so that the directions of the plant stems in the images of the registered agricultural, forest and fishery product stored in the storage unit 2 are constant.

The individual product identification unit 5 collates the image characteristic of the corrected image of the epidermal pattern of the agricultural, forest and fishery product, being a target of individual product identification, with the image characteristic of the image of the epidermal pattern of the registered agricultural, forest and fishery product, and identifies whether the agricultural, forest and fishery product, being a target of individual product identification, is one of the registered agricultural, forest and fishery products. For the extraction of the image characteristics, the extraction technology of a fingerprint such as a luminance value of the image, a characteristic point thereof, an inflection point of a line of binary images, an intersection point thereof, an end-point thereof, and a center point thereof can be used. Further, with regard to the collation method of the image characteristic, for example, the endpoint, the intersection point and an angle of a line of the epidermal pattern are defined as a characteristic point (with the case of the epidermal pattern of the strawberry, the center of a spot of the epidermal is defined as a characteristic point), the collation is performed for an arrangement of the characteristic points, and the image characteristic is determined to be identical when the number of sets of the characteristic points existing in an identical position (a range within a certain threshold) is equal to more than to a constant number. The existing technology of the fingerprint collation can be used for such a collation technology.

Additionally, when the image of the epidermal pattern for which the collation is performed, as shown in FIG. 2, is the image of the epidermal pattern in the area within a constant circumference with the reference point at a center of the operculum, the direction is not fixed with only the reference point (operculum), whereby collating the corrected image of the agricultural, forest and fishery product, being a target of individual product identification, with the image of the epidermal pattern of the registered agricultural, forest and fishery product while rotating the former makes it possible to perform the individual product identification.

As mentioned above, this exemplary embodiment makes it possible to identify the individual product of the agricultural, forest and fishery product without necessitating a special tag.

Further, storing the image of the epidermal pattern of the registered agricultural, forest and fishery product correspondingly to production information such as the production district, the producer name, the variety, the cultivation method, the harvest day, the quality information (the sugar content etc.) and readiness to eat of the above agricultural, forest and fishery product, distribution information such as the shipping location and the shipping date, and the like enables the consumer side to know the history information as well of the above agricultural, forest and fishery product.

Next, a specific example of the individual product identification system in the above-described exemplary embodiment will be described. Additionally, in the following, the melon is exemplified as the agricultural, forest and fishery product for explanation.

Figure 7:
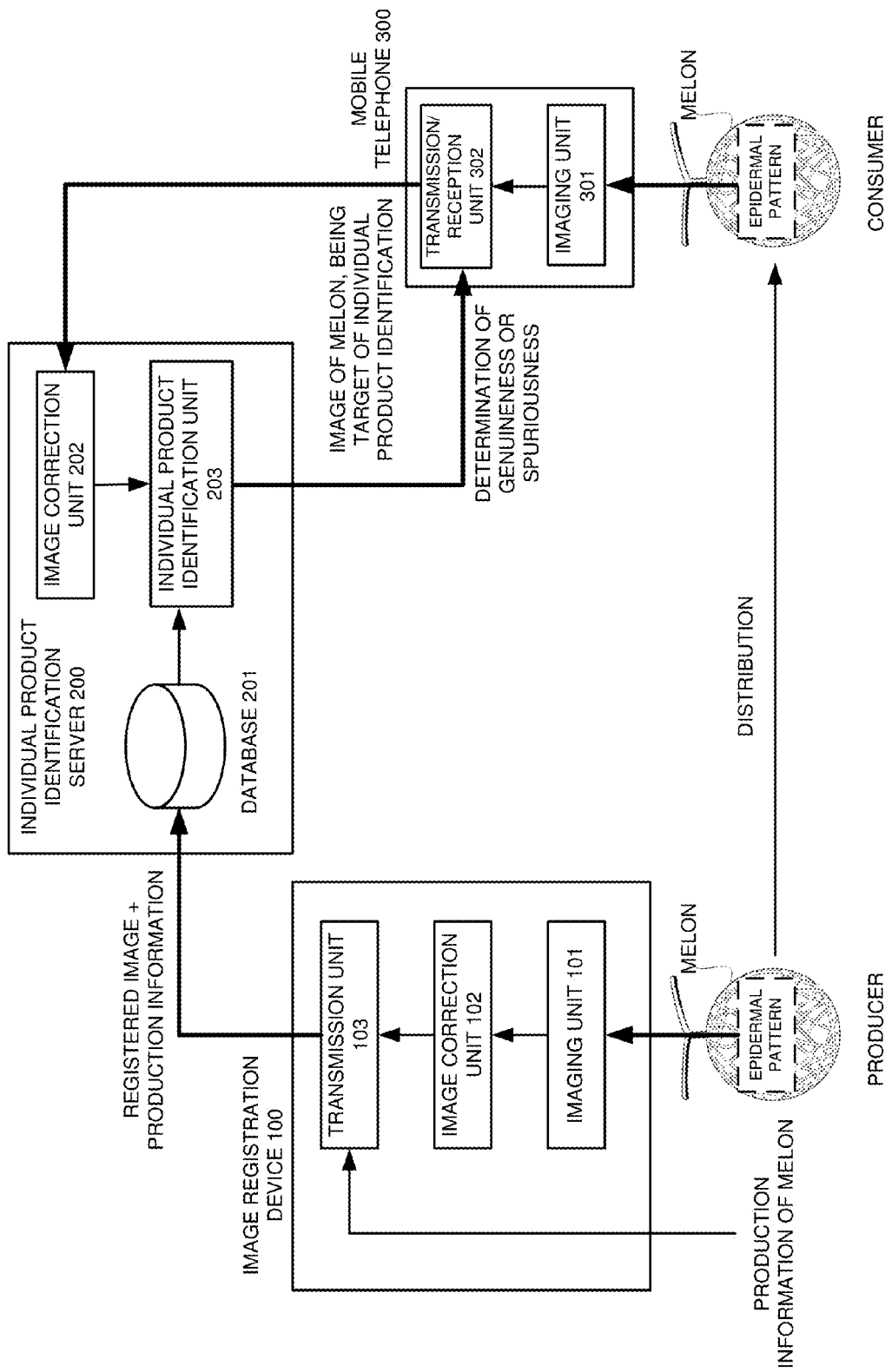
FIG. 7 is a block diagram of a specific example of the present invention.

FIG. 7 is a block diagram of an example of the individual product identification system.

As shown in FIG. 7, the individual product identification system is provided with an image registration device 100 to be installed in the producer side of the melon, an individual product identification server 200 that performs individual product identification, and a mobile telephone 300 of the consumer.

The image registration device 100 includes an imaging unit 101, an image correction unit 102, and a transmission unit 103.

The imaging unit 101 has a configuration similar to that of the imaging unit 1. Additionally, the imaging unit 101 images the image including at least the epidermal pattern of the area within a predetermined circumference with the operculum of the melon (hereinafter, described as a registered melon) to be registered in the individual product identification server 200 at a center.

The image correction unit 102 has a configuration similar to that of the image correction unit 4. For example, when the image imaged by the imaging unit 101 is the image obtained by diagonally imaging the melon as shown in FIG. 4, the image correction unit 102 corrects the image obtained by diagonally imaging the melon to the image obtained by photographing the melon from the just top by employing the reference point (the center of the operculum) and an average shape (sphere), as shown in FIG. 5.

The transmission unit 103 transmits the corrected image of the epidermal pattern of the registered melon and the production information (the production district, the producer name, the variety, the cultivation method, the harvest day, the quality information, and the like) of the above melon.

The individual product identification server 200 includes a database 201, an image correction unit 202, and an individual product identification unit 203.

The image correction unit 202 and the individual product identification unit 203 have a configuration similar to those of the above-described image correction unit 3 and the individual product unit 4, respectively. The image of the epidermal pattern of the registered melon transmitted from the producer side and the production information of the above registered melon are stored correspondingly to each other in the database 201.

The mobile telephone 300 includes an imaging unit 301 and a transmission/reception unit 302. The imaging unit 301 has a configuration similar to that of the above-described imaging unit 4. The transmission/reception unit 302 transmits the image of the epidermal pattern of the melon, being a target of individual product identification, imaged by the imaging unit 301 to the individual product identification server 200. Further, the transmission/reception unit 302 receives a determination result coming from the individual product identification server 200.

Next, an operation of the above-mentioned configuration will be explained.

At first, an operation of registering the image characteristic of the epidermal pattern of the registered melon will be explained.

The producer photographs the epidermal pattern including the operculum and the plant stem from the upper side of the melon with imaging unit 101, as shown in FIG. 2. The imaged image is transmitted to the image correction unit 102 and the correction of the image is performed if necessary.

Further, the producer inputs the production information (the production district, the producer name, the variety, the cultivation method, the harvest day, the quality information, and the like) of the photographed registered melon into the transmission unit 103. And, the transmission unit 103 transmits the image of the epidermal pattern of the registered melon and the production information of the above registered melon to the individual product identification server 200.

The individual product identification server 200 receives the image of the epidermal pattern of the registered melon and the production information coming from the producer, and registers the image of the epidermal pattern of the registered melon and the production information into the database 201.

Continuously, an operation of the individual product identification will be explained.

So as to identify the individual product of the melon, the consumer images the image of the epidermal pattern including the operculum by use of the imaging unit 301 of the mobile telephone 300. The imaged image is transmitted to the individual product identification server 200 by the transmission/reception unit 302.

The image correction unit 202 of the individual product identification server 200 corrects the image of the melon, being a target of the individual product identification, from the transmitted image of the melon, being a target of the individual product identification, with a method similar to the above-described method.

The individual product identification unit 203 collates the image characteristic of the image of the epidermal pattern of the melon subjected to the correction with the image characteristic of the image of the epidermal pattern of the registered melon that has been registered into the database 201, reads out the production information caused to correspond to the above image when there exists the image characteristic that coincides with the registered image characteristic, and transmits it to the mobile telephone 300. On the other hand, the individual product identification unit 203 notifies the effect that the melon, being a target of the individual product identification, has not been registered when there is not the image characteristic that coincides with the registered image characteristic.

The mobile telephone 300 receives a result of the individual product identification from the individual product identification server 200, and notifies it to the consumer.

In such a manner, in this example, the consumer can perform the individual product identification of the agricultural, forest and fishery product without having a special machine member.

Further, by registering not only the epidermal pattern of the agricultural, forest and fishery product but also the production information etc. of the agricultural, forest and fishery product, the label having these pieces of the information described therein becomes useless, and besides, the additional information such as the harvest day and the readiness to eat that differs for each individual product can be retrieved.

Additionally, in the above-described example, the image correction unit 102 for correcting the epidermal pattern of the agricultural, forest and fishery product was configured to be installed into the device of the producer side; however, the image correction unit 202 of the individual product identification server 200 may be used as the image correction unit 102 as well. In this case, a configuration is made so that the producer side transmits the image of the epidermal pattern with the predetermined location of the agricultural, forest and fishery product taken as a reference.

Figure 8:
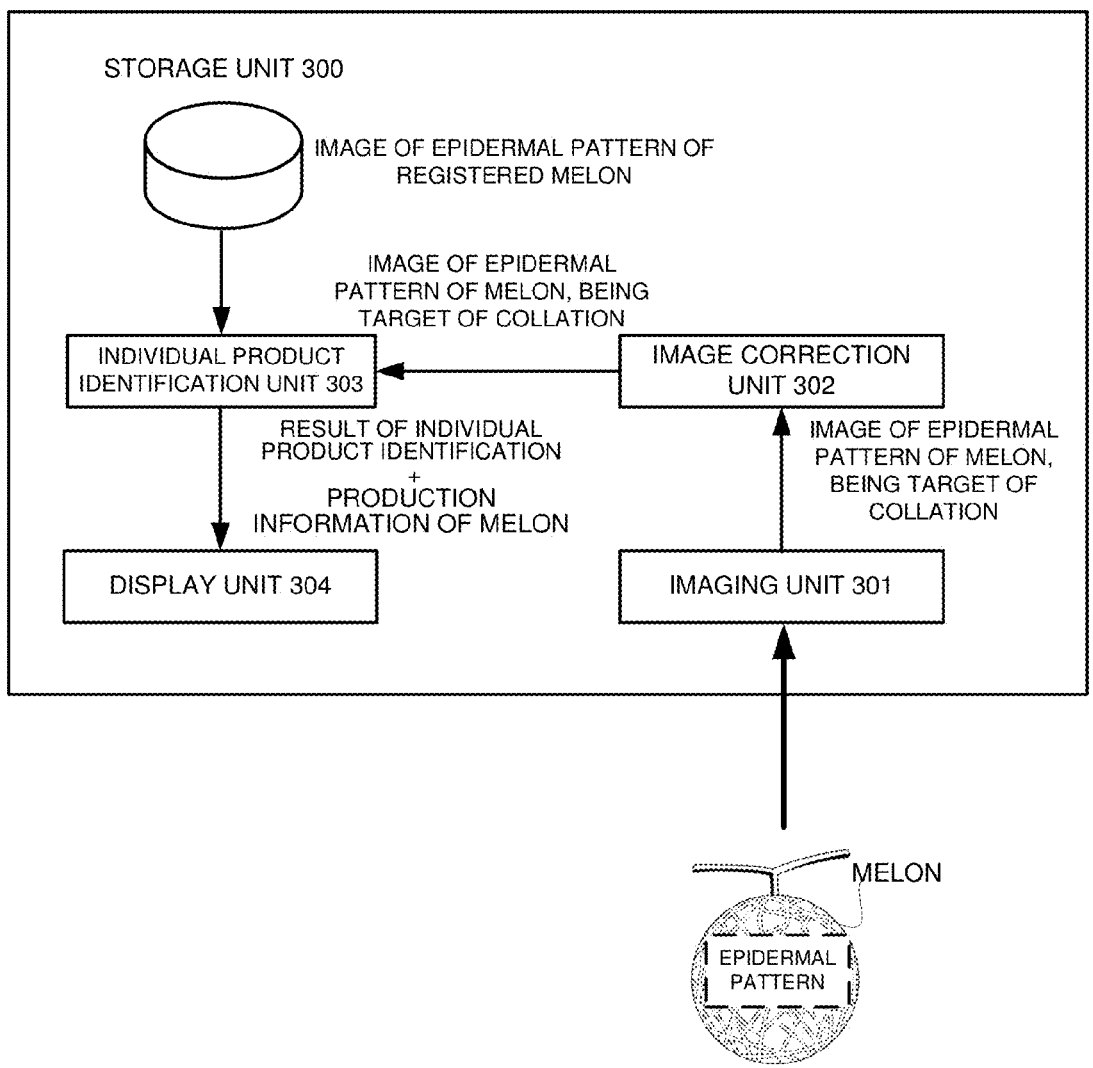
FIG. 8 is a block diagram of an individual product terminal device.

Further, in the above-described example, the individual product identification server 200 was installed, and each consumer side performed the individual product identification process via the communication; however, the image of the epidermal pattern of the agricultural, forest and fishery product may be previously downloaded from the database having the images of the epidermal patterns of the agricultural, forest and fishery product registered therein as is the case with the database 201 to perform the individual product identification process without going through the communication. Such an individual product identification terminal device, as shown in FIG. 8, is provided with a storage unit 300 that stores the image of the epidermal patterns of the registered agricultural, forest and fishery product to be registered by the producer etc., an imaging unit 301, an image correction unit 302, an individual product identification unit 303, and a display unit 304. The imaging unit 301, the image correction unit 302, and the individual product identification unit 303 have a configuration similar to those of the above-described imaging unit, image correction unit, and individual product identification unit, respectively, and the display unit 304 displays the determination result by the individual product identification unit 303, the production information of the above registered agricultural, forest and fishery product in a case in which the image characteristic has been determined to be identical, and the like.

Additionally, as apparent from the above-described explanation, it is also possible to configure the image correction unit and the individual product identification unit with hardware; however, it is also possible to configure them with a computer program. In this case, functions and operations similar to the functions and the operations of the above-described exemplary embodiment and example are realized by a processor that operates under a program stored in a program memory.

One part or an entirety of the above exemplary embodiment can be expressed as the following Supplementary note, but the invention is not limited thereto.

(Supplementary note 1) An individual product identification system of an agricultural, forest and fishery product, comprising:

a storing means in which epidermal pattern images in a predetermined scope with a predetermined location of the registered agricultural, forest and fishery product taken as a reference are stored;

an imaging means that images the epidermal pattern in the predetermined scope with the predetermined location of the agricultural, forest and fishery product, being a target of individual product identification, taken as a reference;

an image correcting means that corrects the epidermal pattern image of the agricultural, forest and fishery product, being a target of individual product identification, imaged by said imaging means to an image for collation with said registered agricultural, forest and fishery product with said predetermined location of the agricultural, forest and fishery product taken as a reference; and an individual product identifying means that collates an image characteristic of the epidermal pattern image of said registered agricultural, forest and fishery product with the image characteristic of said corrected epidermal pattern image, and identifies whether said agricultural, forest and fishery product, being a target of individual product identification, is one of the registered agricultural, forest and fishery products.

(Supplementary note 2) The individual product identification system of the agricultural, forest and fishery product according to Supplementary note 1, wherein said predetermined location of the agricultural, forest and fishery product is at least one of operculum, navel and plant stem of said agriculture product, and a label affixed to said agriculture product.

(Supplementary note 3) The individual product identification system of the agricultural, forest and fishery product according to Supplementary note 1 or Supplementary note 2, wherein said image correcting means corrects a position and a posture of the agricultural, forest and fishery product in the image with said predetermined location of the agricultural, forest and fishery product taken a reference, and generates the epidermal pattern image for collation.

(Supplementary note 4) The individual product identification system of the agricultural, forest and fishery product according to Supplementary note 3, wherein said image correcting means corrects the image of said agricultural, forest and fishery product, being a target of individual product identification, so that a plant stem direction of said registered agricultural, forest and fishery product and that of said agricultural, forest and fishery product, being a target of individual product identification, coincide with each other.

(Supplementary note 5) The individual product identification system of the agricultural, forest and fishery product according to one of Supplementary note 1 to Supplementary note 4, wherein said agricultural, forest and fishery product is at least one of a melon, a strawberry, an apple, a lemon, a pear, and a mandarin.

(Supplementary note 6) An individual product identification server of an agricultural, forest and fishery product for identifying whether the agricultural, forest and fishery product, being a target of individual product identification, is one of registered agricultural, forest and fishery products of which an epidermal pattern with a predetermine location taken a reference has been registered, comprising:

an image correcting means that corrects a received image of the epidermal pattern of the agricultural, forest and fishery product, being a target of individual product identification, to an image for collation with said registered agricultural, forest and fishery product with said predetermined location of the agricultural, forest and fishery product taken as a reference; and an individual product identifying means that collates an image characteristic of the epidermal pattern image of said registered agricultural, forest and fishery product with the image characteristic of said corrected epidermal pattern image, and identifies whether said agricultural, forest and fishery product, being a target of individual product identification, is one of the registered agricultural, forest and fishery products.

(Supplementary note 7) The individual product identification server of the agricultural, forest and fishery product according to Supplementary note 6, wherein said predetermined location of the agricultural, forest and fishery product is at least one of operculum, navel and plant stem of said agriculture product, and a label affixed to said agriculture product.

(Supplementary note 8) The individual product identification server according to Supplementary note 6 or Supplementary note 7, wherein said image correcting means corrects a position and a posture of the agricultural, forest and fishery product in the image with said predetermined location of the agricultural, forest and fishery product taken a reference, and generates the epidermal pattern image for collation.

(Supplementary note 9) The individual product identification server of the agricultural, forest and fishery product according to Supplementary note 8, wherein said image correcting means corrects the image of said agricultural, forest and fishery product, being a target of individual product identification, so that a plant stem direction of said registered agricultural, forest and fishery product and that of said agricultural, forest and fishery product, being a target of individual product identification, coincide with each other.

(Supplementary note 10) The individual product identification server of the agricultural, forest and fishery product according to one of Supplementary note 6 to Supplementary note 9, wherein said agricultural, forest and fishery product is at least one of a melon, a strawberry, an apple, a lemon, a pear, and a mandarin.

(Supplementary note 11) An image registration device for, into an individual product identification server of an agricultural, forest and fishery product for identifying whether the agricultural, forest and fishery product, being a target of individual product identification, is one of registered agricultural, forest and fishery products of which an epidermal pattern with a predetermine location taken a reference has been registered, registering an image of the epidermal pattern of said registered agricultural, forest and fishery product, comprising:

an imaging means that images the epidermal pattern in a predetermined scope with the predetermined location of the registered agricultural, forest and fishery product taken as a reference;

an image correcting means that corrects the epidermal pattern image of the registered agricultural, forest and fishery product imaged by said imaging means to an image for collation with the predetermined location of said registered agricultural, forest and fishery product taken as a reference; and a registering means that registers said corrected image for collation into the individual product identification server.

(Supplementary note 12) An individual product identification terminal device for identifying whether an agricultural, forest and fishery product, being a target of individual product identification, is one of registered agricultural, forest and fishery products, comprising:

a storing means in which epidermal pattern images in a predetermined scope with a predetermined location of the registered agricultural, forest and fishery product taken as a reference are stored;

an imaging means that images the epidermal pattern in a predetermined scope with the predetermined location of the agricultural, forest and fishery product, being a target of individual product identification, taken as a reference;

an image correcting means that corrects the epidermal pattern image of the agricultural, forest and fishery product, being a target of individual product identification, imaged by said imaging means, to an image for collation with said registered agricultural, forest and fishery product with said predetermined location of the agricultural, forest and fishery product taken as a reference;

an individual product identifying means that collates an image characteristic of the epidermal pattern image of said registered agricultural, forest and fishery product with the image characteristic of said corrected epidermal pattern image, and identifies whether said agricultural, forest and fishery product, being a target of individual product identification, is one of the registered agricultural, forest and fishery products; and a displaying means that displays said identification result.

(Supplementary note 13) An individual product identification method, comprising:

previously storing epidermal pattern images in a predetermined scope with a predetermined location of a registered agricultural, forest and fishery product taken as a reference;

imaging the epidermal pattern in the predetermined scope with the predetermined location of the agricultural, forest and fishery product, being a target of individual product identification, taken as a reference;

correcting said imaged epidermal pattern image of the agricultural, forest and fishery product, being a target of individual product identification to an image for collation with said registered agricultural, forest and fishery product with said predetermined location of the agricultural, forest and fishery product taken as a reference: and collating an image characteristic of the epidermal pattern image of said registered agricultural, forest and fishery product with the image characteristic of said corrected epidermal pattern image, and identifying whether said agricultural, forest and fishery product, being a target of individual product identification, is one of the registered agricultural, forest and fishery products.

(Supplementary note 14) The individual product identification method according to Supplementary note 13, wherein said predetermined location of the agricultural, forest and fishery product is at least one of operculum, navel and plant stem of said agriculture product, and a label affixed to said agriculture product.

(Supplementary note 15) The individual product identification method according to Supplementary note 13 or Supplementary note 14, comprising correcting a position and a posture of the agricultural, forest and fishery product in the image with said predetermined location of the agricultural, forest and fishery product taken a reference, and generating the epidermal pattern image for collation.

(Supplementary note 16) The individual product identification method according to Supplementary note 15, comprising correcting the image of said agricultural, forest and fishery product, being a target of individual product identification, so that a plant stem direction of said registered agricultural, forest and fishery product and that of said agricultural, forest and fishery product, being a target of individual product identification, coincide with each other.

(Supplementary note 17) The individual product identification method according to one of Supplementary note 13 to Supplementary note 16, wherein said agricultural, forest and fishery product is at least one of a melon, a strawberry, an apple, a lemon, a pear, and a mandarin.

(Supplementary note 18) An individual product identification program of an agricultural, forest and fishery product for identifying whether the agricultural, forest and fishery product, being a target of individual product identification, is one of registered agricultural, forest and fishery products of which an epidermal pattern with a predetermine location taken a reference has been registered, said program causing an information processing device to execute comprising:

an image correction process of correcting a received image of the epidermal pattern of the agricultural, forest and fishery product, being a target of individual product identification, to an image for collation with said registered agricultural, forest and fishery product with said predetermined location of the agricultural, forest and fishery product taken as a reference; and an individual product identification process of collating an image characteristic of the epidermal pattern image of said registered agricultural, forest and fishery product with the image characteristic of said corrected epidermal pattern image, and identifying whether said agricultural, forest and fishery product, being a target of individual product identification, is one of the registered agricultural, forest and fishery products.

Above, although the present invention has been particularly described with reference to the preferred embodiments and the examples, it should be readily apparent to those of ordinary skill in the art that the present invention is not always limited to the above-mentioned embodiments and examples, and changes and modifications in the form and details may be made without departing from the spirit and scope of the invention.

This application is based upon and claims the benefit of priority from Japanese patent application No. 2011-047241, filed on Mar. 4, 2011, the disclosure of which is incorporated herein in its entirety by reference.

REFERENCE SIGNS LIST 1 imaging unit
2 storage unit
3 imaging unit
4 image correction unit
5 individual product identification unit

The invention claimed is:

1. An individual product identification system of an agricultural, forest and fishery product, comprising:
 a storage in which epidermal pattern images in a predetermined scope with a predetermined location of the registered agricultural, forest and fishery product taken as a reference are stored;
 an imaging unit that images the epidermal pattern in the predetermined scope with the predetermined location of the agricultural, forest and fishery product, being a target of individual product identification, taken as a reference;
 an image correcting unit that corrects the epidermal pattern image of the agricultural, forest and fishery product, being a target of individual product identification, imaged by said imaging unit to an image for collation with said registered agricultural, forest and fishery product with said predetermined location of the agricultural, forest and fishery product taken as a reference; and
 an individual product identifying unit that collates an image characteristic of the epidermal pattern image of said registered agricultural, forest and fishery product with the image characteristic of said corrected epidermal pattern image, and identifies whether said agricultural, forest and fishery product, being a target of individual product identification, is one of the registered agricultural, forest and fishery products.

2. The individual product identification system of the agricultural, forest and fishery product according to claim 1, wherein said predetermined location of the agricultural, forest and fishery product is at least one of operculum, navel and plant stem of said agriculture product, and a label affixed to said agriculture product.

3. The individual product identification system of the agricultural, forest and fishery product according to claim 1, wherein said image correcting unit corrects a position and a posture of the agricultural, forest and fishery product in the image with said predetermined location of the agricultural, forest and fishery product taken a reference, and generates the epidermal pattern image for collation.

4. The individual product identification system of the agricultural, forest and fishery product according to claim 3, wherein said image correcting unit corrects the image of said agricultural, forest and fishery product, being a target of individual product identification, so that a plant stem direction of said registered agricultural, forest and fishery product and that of said agricultural, forest and fishery product, being a target of individual product identification, coincide with each other.

5. The individual product identification system of the agricultural, forest and fishery product according to claim 1, wherein said agricultural, forest and fishery product is at least one of a melon, a strawberry, an apple, a lemon, a pear, and a mandarin.

6. An individual product identification server of an agricultural, forest and fishery product for identifying whether the agricultural, forest and fishery product, being a target of individual product identification, is one of registered agricultural, forest and fishery products of which an epidermal pattern with a predetermine location taken a reference has been registered, comprising:
 an image correcting unit that corrects a received image of the epidermal pattern of the agricultural, forest and fishery product, being a target of individual product identification, to an image for collation with said registered agricultural, forest and fishery product with said predetermined location of the agricultural, forest and fishery product taken as a reference; and
 an individual product identifying unit that collates an image characteristic of the epidermal pattern image of said registered agricultural, forest and fishery product with the image characteristic of said corrected epidermal pattern image, and identifies whether said agricultural, forest and fishery product, being a target of individual product identification, is one of the registered agricultural, forest and fishery products.

7. The individual product identification server of the agricultural, forest and fishery product according to claim 6, wherein said predetermined location of the agricultural, forest and fishery product is at least one of operculum, navel and plant stem of said agriculture product, and a label affixed to said agriculture product.

8. The individual product identification server according to claim 6, wherein said image correcting unit corrects a position and a posture of the agricultural, forest and fishery product in the image with said predetermined location of the agricultural, forest and fishery product taken a reference, and generates the epidermal pattern image for collation.

9. The individual product identification server of the agricultural, forest and fishery product according to claim 8, wherein said image correcting unit corrects the image of said agricultural, forest and fishery product, being a target of individual product identification, so that a plant stem direction of said registered agricultural, forest and fishery product and that of said agricultural, forest and fishery product, being a target of individual product identification, coincide with each other.

10. The individual product identification server of the agricultural, forest and fishery product according to claim 6, wherein said agricultural, forest and fishery product is at least one of a melon, a strawberry, an apple, a lemon, a pear, and a mandarin.

11. An image registration device for, into an individual product identification server of an agricultural, forest and fishery product for identifying whether the agricultural, forest and fishery product, being a target of individual product identification, is one of registered agricultural, forest and fishery products of which an epidermal pattern with a predetermine location taken a reference has been registered, registering an image of the epidermal pattern of said registered agricultural, forest and fishery product, comprising:
 an imaging unit that images the epidermal pattern in a predetermined scope with the predetermined location of the registered agricultural, forest and fishery product taken as a reference;
 an image correcting unit that corrects the epidermal pattern image of the agricultural, forest and fishery product imaged by said imaging unit to an image for collation with the predetermined location of said registered agricultural, forest and fishery product taken as a reference; and a registering unit that registers said corrected image for collation into the individual product identification server.

12. An individual product identification terminal device for identifying whether an agricultural, forest and fishery product, being a target of individual product identification, is one of registered agricultural, forest and fishery products, comprising:

a storage in which epidermal pattern images in a predetermined scope with a predetermined location of the registered agricultural, forest and fishery product taken as a reference are stored;

an imaging unit that images the epidermal pattern in a predetermined scope with the predetermined location of the agricultural, forest and fishery product, being a target of individual product identification, taken as a reference;

an image correcting unit that corrects the epidermal pattern image of the agricultural, forest and fishery product, being a target of individual product identification, imaged by said imaging unit, to an image for collation with said registered agricultural, forest and fishery product with said predetermined location of the agricultural, forest and fishery product taken as a reference:

an individual product identifying unit that collates an image characteristic of the epidermal pattern image of said registered agricultural, forest and fishery product with the image characteristic of said corrected epidermal pattern image, and identifies whether said agricultural, forest and fishery product, being a target of individual product identification, is one of the registered agricultural, forest and fishery products; and a displaying unit that displays said identification result.

13. An individual product identification method, comprising:

previously storing epidermal pattern images in a predetermined scope with a predetermined location of a registered agricultural, forest and fishery product taken as a reference;

imaging the epidermal pattern in the predetermined scope with the predetermined location of the agricultural, forest and fishery product, being a target of individual product identification, taken as a reference;

correcting said imaged epidermal pattern image of the agricultural, forest and fishery product, being a target of individual product identification to an image for collation with said registered agricultural, forest and fishery product with said predetermined location of the agricultural, forest and fishery product taken as a reference: and collating an image characteristic of the epidermal pattern image of said registered agricultural, forest and fishery product with the image characteristic of said corrected epidermal pattern image, and identifying whether said agricultural, forest and fishery product, being a target of individual product identification, is one of the registered agricultural, forest and fishery products.

14. The individual product identification method according to claim 13, wherein said predetermined location of the agricultural, forest and fishery product is at least one of operculum, navel and plant stem of said agriculture product, and a label affixed to said agriculture product.

15. The individual product identification method according to claim 13, comprising correcting a position and a posture of the agricultural, forest and fishery product in the image with said predetermined location of the agricultural, forest and fishery product taken a reference, and generating the epidermal pattern image for collation.

16. The individual product identification method according to claim 15, comprising correcting the image of said agricultural, forest and fishery product, being a target of individual product identification, so that a plant stem direction of said registered agricultural, forest and fishery product and that of said agricultural, forest and fishery product, being a target of individual product identification, coincide with each other.

17. The individual product identification method according to claim 13, wherein said agricultural, forest and fishery product is at least one of a melon, a strawberry, an apple, a lemon, a pear, and a mandarin.

18. A non-transitory computer readable storage medium storing an individual product identification program of an agricultural, forest and fishery product for identifying whether the agricultural, forest and fishery product, being a target of individual product identification, is one of registered agricultural, forest and fishery products of which an epidermal pattern with a predetermine location taken a reference has been registered, said program causing an information processing device to execute comprising:

an image correction process of correcting a received image of the epidermal pattern of the agricultural, forest and fishery product, being a target of individual product identification, to an image for collation with said registered agricultural, forest and fishery product with said predetermined location of the agricultural, forest and fishery product taken as a reference; and an individual product identification process of collating an image characteristic of the epidermal pattern image of said registered agricultural, forest and fishery product with the image characteristic of said corrected epidermal pattern image, and identifying whether said agricultural, forest and fishery product, being a target of individual product identification, is one of the registered agricultural, forest and fishery products.

* * * * *